US 7,457,984 B2

(12) United States Patent
Kutan et al.

(10) Patent No.: US 7,457,984 B2
(45) Date of Patent: Nov. 25, 2008

(54) METHOD AND SYSTEM FOR ROLLBACK-FREE FAILURE RECOVERY OF MULTI-STEP PROCEDURES

(75) Inventors: Serkan M. Kutan, Seattle, WA (US); Shaun D. Cox, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/614,466

(22) Filed: Dec. 21, 2006

(65) Prior Publication Data
US 2007/0101192 A1    May 3, 2007

Related U.S. Application Data

(63) Continuation of application No. 10/659,453, filed on Sep. 10, 2003, now Pat. No. 7,174,479.

(51) Int. Cl.
*G06F 11/00* (2006.01)
(52) U.S. Cl. .......................................... 714/18; 714/16
(58) Field of Classification Search ................... 714/16, 714/18
See application file for complete search history.

(56) References Cited

U.S. PATENT DOCUMENTS

| 4,663,706 | A | 5/1987 | Allen et al. |
|---|---|---|---|
| 4,807,224 | A | 2/1989 | Naron et al. |
| 4,878,167 | A | 10/1989 | Kapulka et al. |
| 5,151,987 | A | 9/1992 | Abraham et al. |
| 5,440,545 | A | 8/1995 | Buchholz et al. |
| 5,774,479 | A | 6/1998 | Lee et al. |
| 5,842,224 | A | 11/1998 | Fenner |
| 5,884,327 | A | 3/1999 | Cotner et al. |
| 5,889,772 | A | 3/1999 | Fischer et al. |
| 6,199,055 | B1 | 3/2001 | Kara et al. |
| 6,247,012 | B1 | 6/2001 | Kitamura et al. |
| 6,321,374 | B1 | 11/2001 | Choy |
| 6,377,959 | B1 | 4/2002 | Carlson |
| 6,463,456 | B1 | 10/2002 | Kan et al. |
| 6,502,088 | B1 | 12/2002 | Gajda et al. |
| 6,535,997 | B1 | 3/2003 | Janson et al. |
| 6,728,747 | B1 * | 4/2004 | Jenkins et al. ............... 718/101 |
| 6,735,620 | B1 * | 5/2004 | Blackmore et al. .......... 709/212 |
| 6,965,571 | B2 | 11/2005 | Webber |
| 7,178,060 | B2 * | 2/2007 | Bamford ....................... 714/16 |
| 2004/0083276 | A1 | 4/2004 | Shiraga |
| 2005/0055606 | A1 | 3/2005 | Kutan et al. |

* cited by examiner

*Primary Examiner*—Scott T. Baderman
*Assistant Examiner*—Paul F. Contino
(74) *Attorney, Agent, or Firm*—Perkins Coie LLP

(57) ABSTRACT

Disclosed is a rollback-free method for performing multi-step procedures in the presence of possible failure. As the procedure proceeds from its initial state through transitions to its final state, its constituent transitions are monitored for failure. If a failure is detected, then the procedure is "sidetracked" into a recovery coordination state. From the recovery coordination state, the procedure is logically taken back to its initial state and retried. In this manner, the procedure is shepherded, without rollbacks, through its transitions until it successfully reaches its final state. In a particular embodiment, a multi-step procedure is developed for moving a resource from one resource server to another The steps of the procedure are designed so that all throughout the procedure, both of the resource servers and a directory server are kept synchronized. This allows client requests to proceed without interruption even during the resource movement.

14 Claims, 11 Drawing Sheets

Prior Art Two-Phase Commit

Prior Art Rollback Procedure

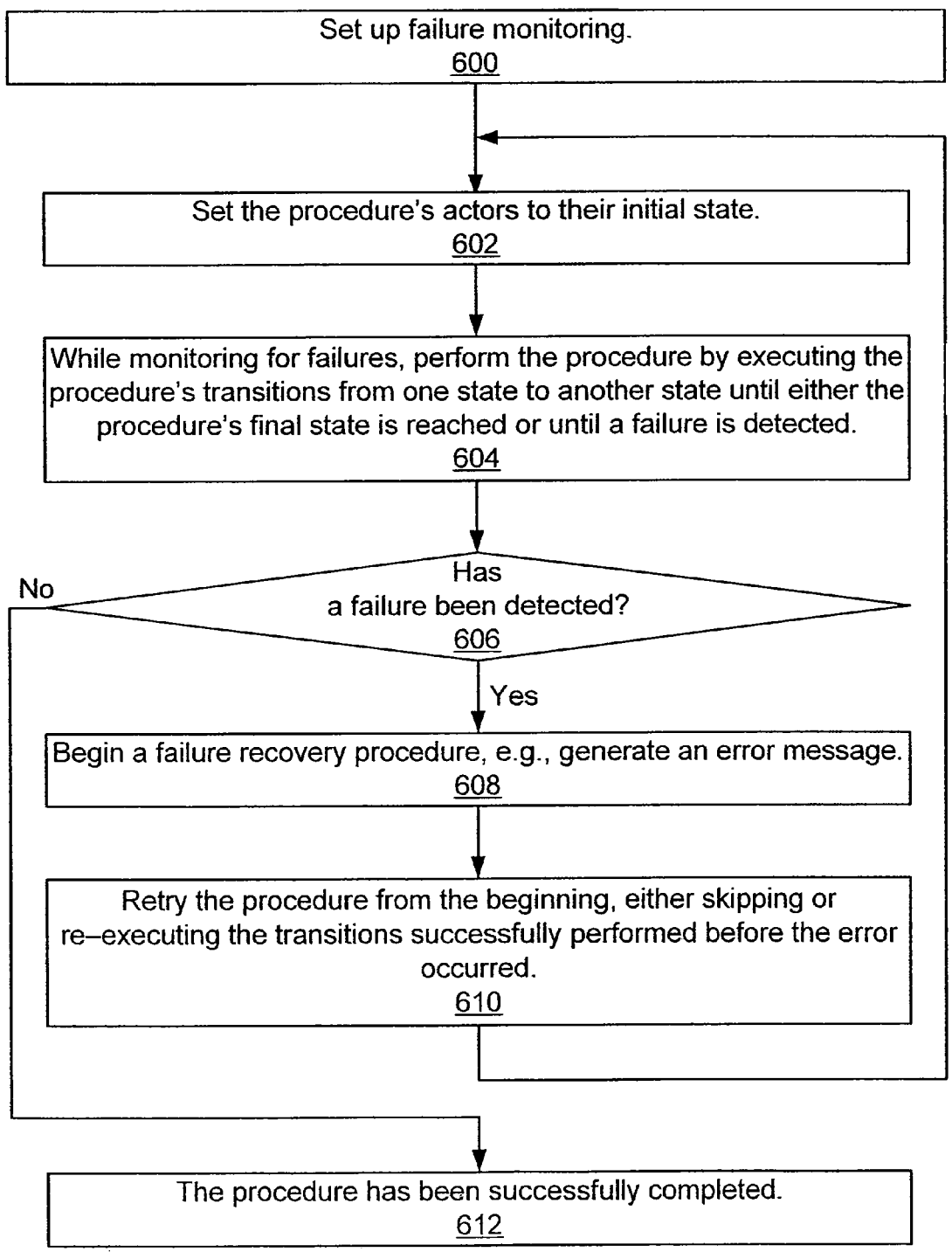

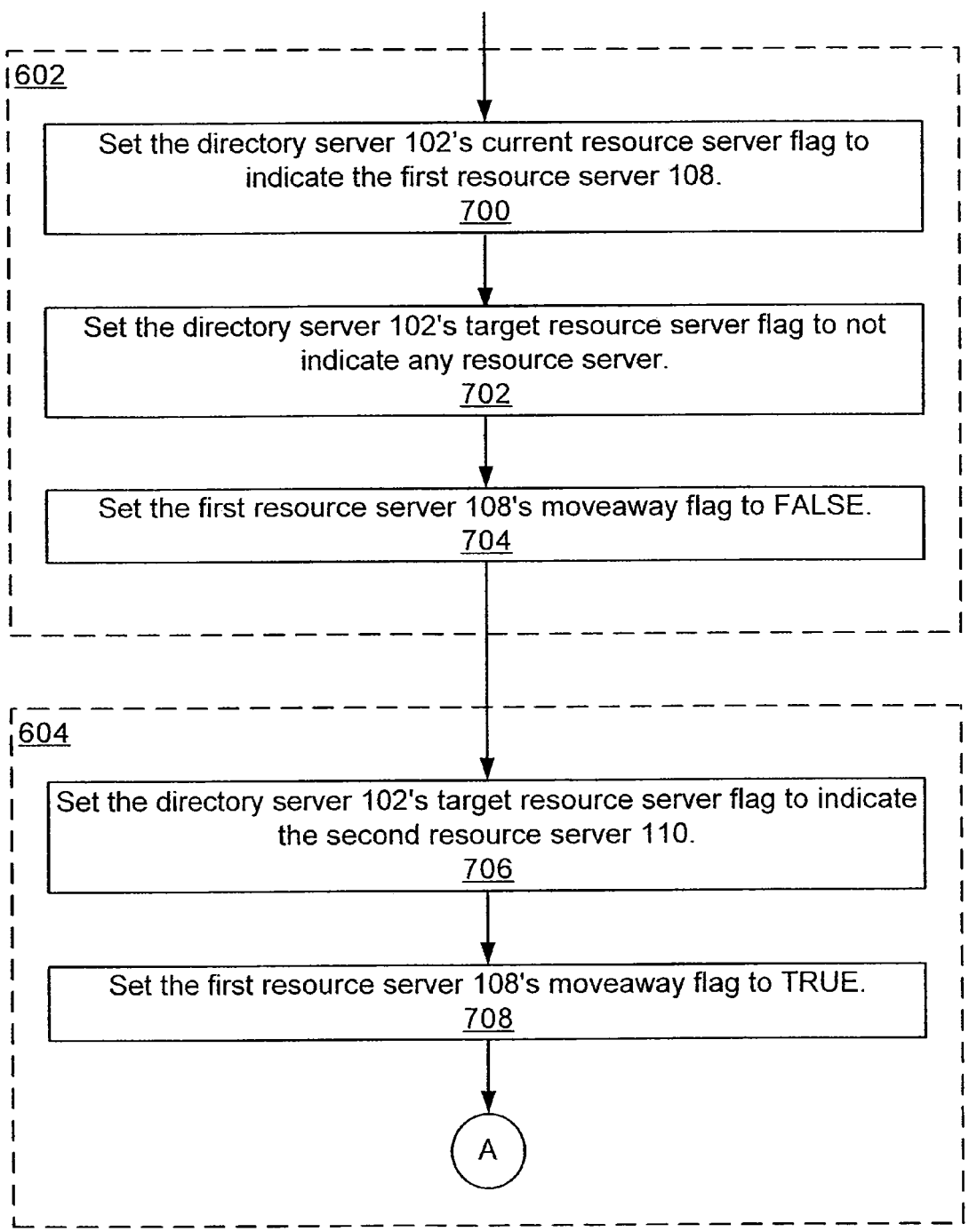

METHOD AND SYSTEM FOR ROLLBACK-FREE FAILURE RECOVERY OF MULTI-STEP PROCEDURES

CROSS-REFERENCE TO RELATED APPLICATIONS

This application is a continuation of U.S. patent application Ser. No. 10/659,453 entitled "METHOD AND SYSTEM FOR ROLLBACK-FREE FAILURE RECOVERY OF MULTI-STEP PROCEDURES," filed on Sep. 10, 2003, which application is incorporated herein by reference in its entirety.

TECHNICAL FIELD

BACKGROUND OF THE INVENTION

Complex procedures are the norm in today's interconnected computing world. A "complex" procedure is one whose successful completion requires the successful completion of a number of separate steps. If any one of these separate, constituent steps fails, then the procedure as a whole also fails.

Advances in communications allow various steps of a complex procedure to be performed on various computing devices. In some cases, the use of multiple computing devices is inherent in the procedure itself, as when a client requests a resource from a resource server. This common scenario becomes even more complex if the resource server asks an authentication server to verify the client's credentials before fulfilling the request. The client's request will fail if any one of the devices, the client, the resource server, or the authentication server, fails to perform its part of the transaction. The client's request can also fail because of a communications failure in the networks connecting these three devices.

In other cases, the complex procedure can be performed on a single computing device, but multiple devices are invoked to speed the procedure. For example, an intensive mathematical computation is broken into steps, and the steps are distributed to individual servers. As one hedge against possible failure, the same computational step can be distributed to a number of servers. In any case, a failure of one step causes the entire computation to fail or, in the case of redundant servers, can slow down the production of the final result.

The potential for trouble in a multi-step procedure increases when the procedure involves multiple databases. Here, a failure can not only prevent a client's database request from being fulfilled, but can also leave the databases in inconsistent states, i.e., "unsynchronized." For a simplified example, consider a computing environment with two resource servers and a directory server that directs client resource requests to the appropriate resource server. Moving a resource from one resource server to another (in order to, for instance, balance the load of requests between the resource servers) involves the updating of both of the resource servers and of the directory server. A failure in the multi-step resource movement procedure could leave the directory server directing client requests to a resource server that no longer has, or does not yet have, the appropriate resource.

Techniques have been developed to mitigate failures in multi-step procedures that, like the situation given above, involve multiple databases. If all of the computing devices involved in the procedure use the same type of database, then a well known "two-phase commit" process can be invoked. The two-phase commit is designed to keep the databases synchronized at their pre-procedure state if an error occurs at any time during the procedure. In the first phase, each of the databases involved receives an update command. A transaction monitoring system then issues a "pre-commit" message to each database. If a database can successfully perform the update, then it temporarily stores the update and acknowledges the pre-commit command. If the transaction monitor receives acknowledgements from all of the databases involved, then it issues to them a "commit" message. Upon receiving the commit, each database makes the temporary change permanent. The procedure has been successfully performed, and the databases are now synchronized in their post-procedure state. If, on the other hand, the transaction monitor does not receive all of the expected acknowledgements, then the multi-step database update procedure has failed, and the temporary changes at each database are discarded. While the procedure has failed, the databases are synchronized in their pre-procedure state. Because of this synchronization, it is possible to either safely retry the multi-step database update procedure or to safely abandon the attempt.

Useful as it is, the two-phase commit only applies to a limited scope of procedures. It only works well if all of the servers involved use the same type of database. (It can be implemented across different database types, but at a significant increase in cost and complexity.) It also does not work where the multi-step procedure calls for changes to data structures other than databases.

Another useful technique for managing errors during a multi-step procedure is the "rollback." Here, for each step of the multi-step procedure a method is developed for "rolling back," or undoing, the results of that step. When a step fails, its partial results are rolled back. The results of previous, successfully performed steps can also be rolled back. This continues with all of the involved devices until they are all in their pre-procedure state. Then, just as in the case of a failed two-phase commit, it is safe to either retry the multi-step procedure or to safely abandon the attempt.

The rollback procedure, though in theory more widely applicable than the two-phase commit, has its own serious drawbacks. First, just like any other step in the multi-step procedure, each rollback step can itself fail. To handle this, a method of rolling back each rollback step is developed. This illustrates the second drawback: Adding rollback steps to a multi-step procedure complicates an already complicated scenario. This additional complication increases both the development and the processing costs of the multi-step procedure and may actually decrease the overall probability of the procedure's success.

SUMMARY OF THE INVENTION

In view of the foregoing, the present invention provides a rollback-free method for performing multi-step procedures in the presence of possible failure. As the procedure proceeds from its initial state through transitions to its final state, its constituent transitions are monitored for failure. If a failure is detected, then the procedure is "sidetracked" into a recovery coordination state. From the recovery coordination state, the procedure is logically taken back to its initial state and retried. Each of the transitions leading up to the failed transition can be either re-executed or simply skipped, relying upon the results achieved before the failure. In this manner, the procedure is shepherded, without rollbacks, through its transitions until it successfully reaches its final state.

In some embodiments, to ensure that the transitions in the multi-step procedure need not be rolled back when a failure is detected, the transitions are designed to be "idempotent," that is, the transition can be performed any number of times with the same result.

In a particular embodiment, a multi-step procedure is developed for moving a resource from one resource server to another. The steps of the procedure are designed so that all throughout the procedure, both of the resource servers and a directory server are kept synchronized. This allows client requests to proceed without interruption even during the resource movement.

As the resource movement example illustrates, the methods of the present invention do not depend upon having a unified database structure, or indeed any database structure at all, on the servers involved in the multi-step procedure.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 6 is a flowchart of an exemplary method according to the present invention for performing a procedure without rollbacks;

FIGS. 7a and 7b together form a flowchart of an exemplary procedure according to the present invention for moving a resource from one resource server to another without rollbacks.

DETAILED DESCRIPTION OF THE INVENTION

Figure 1:
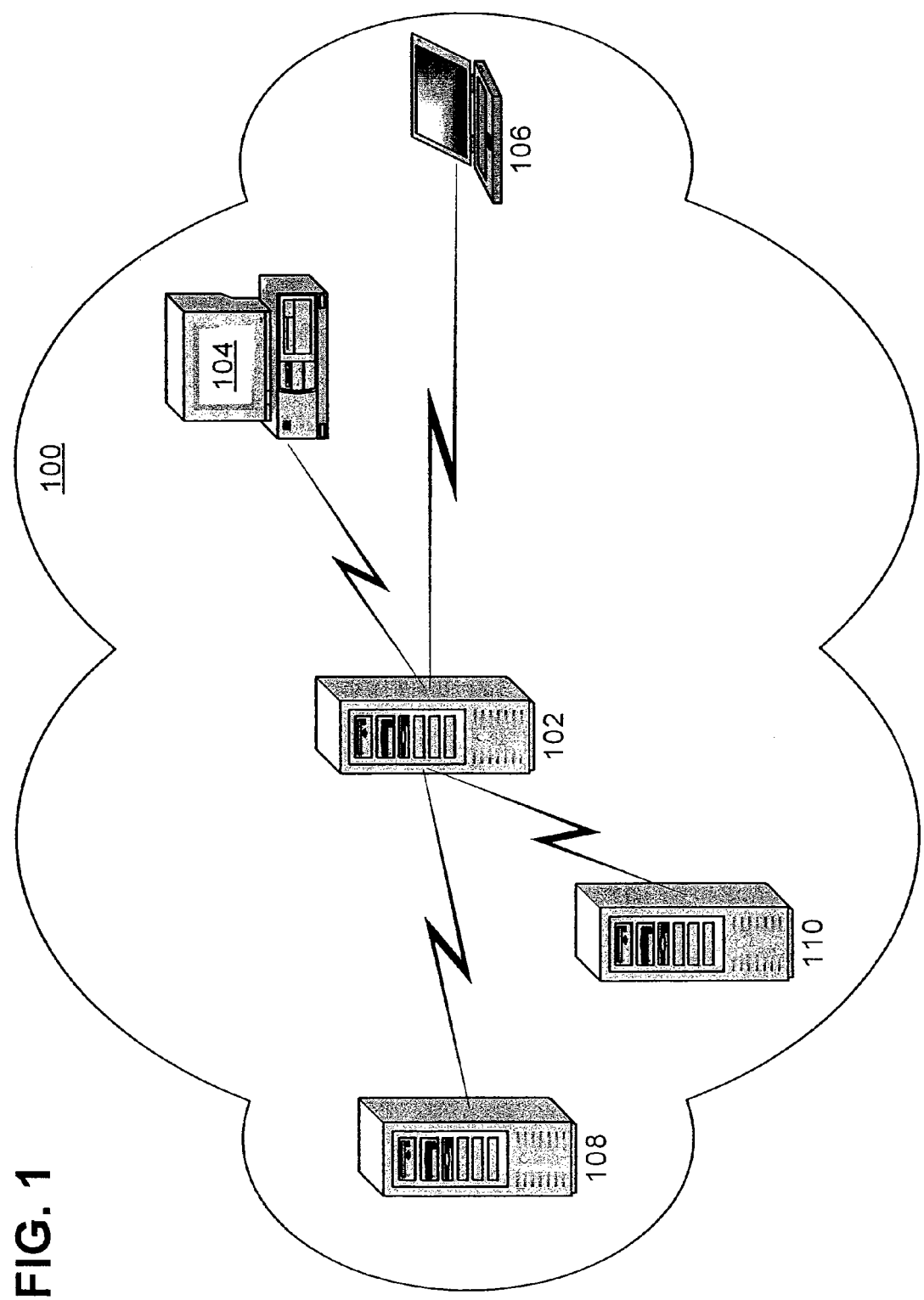
FIG. 1 is a block diagram of a computing environment with a directory server and two resource servers.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The present invention provides a rollback-free method for performing multi-step procedures in the presence of possible failure. FIG. 1 presents a computing environment 100 that introduces the actors in the present discussion. In the computing environment 100 are a directory server 102 and two clients 104 and 106. When the client 104 asks the directory server 102 for a resource, the request is forwarded on to whichever resource server, 108 or 110, hosts the appropriate resource. Although FIG. 1 depicts clients and servers, the methods of the present invention are also fully applicable to peer-to-peer networking environments. The present invention is also not restricted to procedures that provide resources, but is generally applicable to multi-step procedures of any kind.

The computing environment of FIG. 1 is merely illustrative. Those familiar with modern client/server techniques may note that the simplified computing environment 100 leaves out several interesting aspects such as security, authentication, redundant communications, and server administration. These details, while important in a particular implementation, are well known in the art, and their presence here would merely confuse the description of the present invention.

Any of the devices of FIG. 1 may need to perform a multi-step procedure. While the methods of the present invention are applicable in the simplest case where the procedure occurs entirely on one device, the following examples focus on the more interesting case where several devices must cooperate in order to perform the procedure. For example, when a resource is moved from the resource server 108 to the other resource server 110, the procedure must coordinate the activities of both of those resource servers along with the activities of the directory server 102 and of the potential clients 104 and 106. This particular example is presented in greater detail below in reference to FIGS. 7a and 7b.

Figure 2:
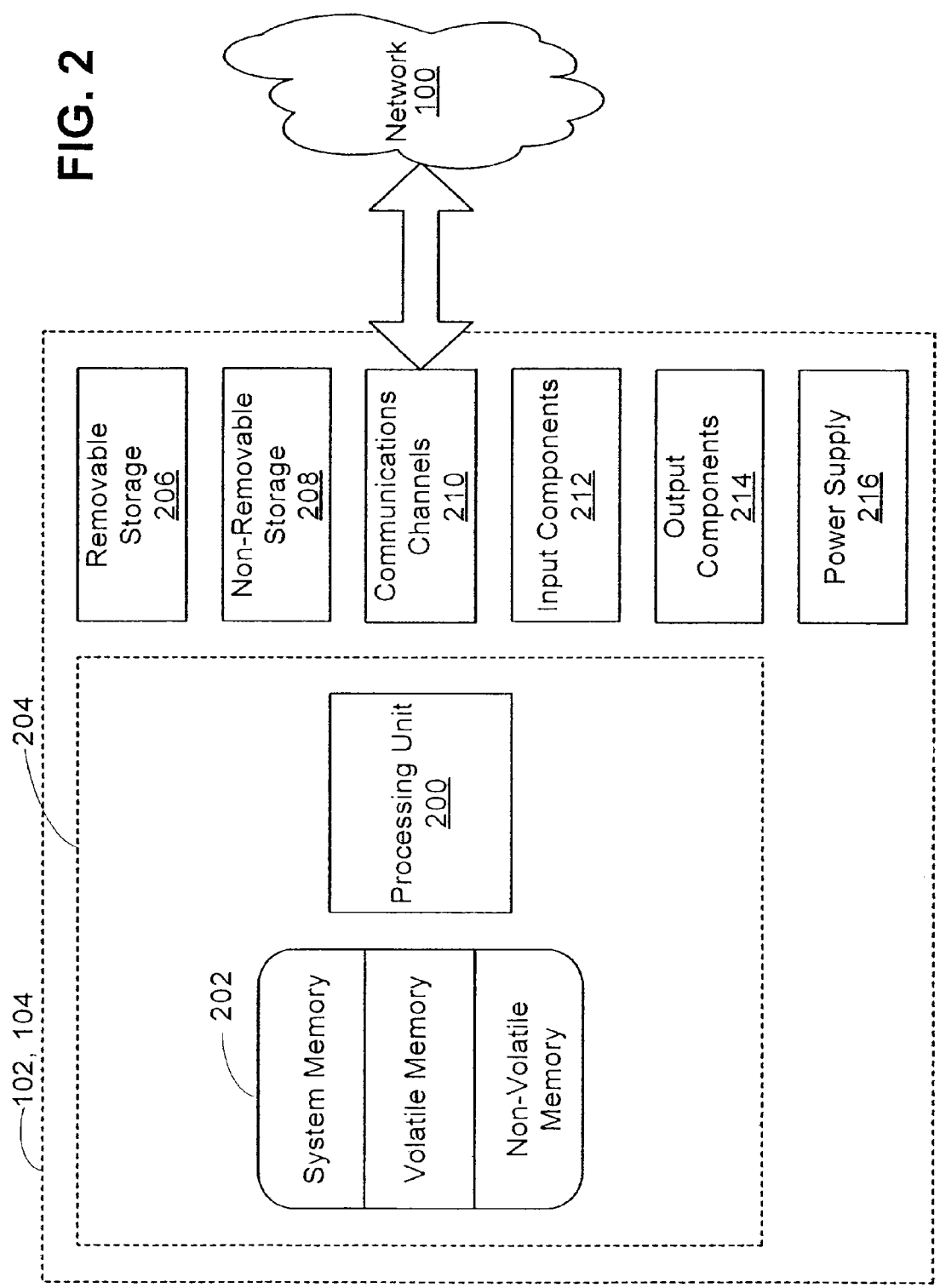
FIG. 2 is a schematic diagram generally illustrating an exemplary computer system that supports the present invention.

The server 102 and the client 104 of FIG. 1 may be of any architecture. FIG. 2 is a block diagram generally illustrating an exemplary computer system that supports the present invention. The computer system of FIG. 2 is only one example of a suitable environment and is not intended to suggest any limitation as to the scope of use or functionality of the invention. Neither should the computing device 102 be interpreted as having any dependency or requirement relating to any one or combination of components illustrated in FIG. 2. The invention is operational with numerous other general-purpose or special-purpose computing environments or configurations. Examples of well known computing systems, environments, and configurations suitable for use with the invention include, but are not limited to, personal computers, servers, hand-held or laptop devices, tablet devices, multiprocessor systems, microprocessor-based systems, set-top boxes, programmable consumer electronics, network PCs, minicomputers, mainframe computers, and distributed computing environments that include any of the above systems or devices. In its most basic configuration, the computing device 102 typically includes at least one processing unit 200 and memory 202. The memory 202 may be volatile (such as RAM), non-volatile (such as ROM or flash memory), or some combination of the two. This most basic configuration is illustrated in FIG. 2 by the dashed line 204. The computing device 102 may have additional features and functionality. For example, the computing device 102 may include additional storage (removable and non-removable) including, but not limited to, magnetic and optical disks and tape. Such additional storage is illustrated in FIG. 2 by removable storage 206 and non-removable storage 208. Computer-storage media include volatile and non-volatile, removable and non-removable media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the device 102. Any such computer-storage media may be part of the device 102. The device 102 may also contain communications channels 210 that allow the device 102 to communicate with other devices. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, RF, infrared, and other wireless media. The term "computer-readable media" as used herein includes both storage media and communications media. The computing device 102 may also have input devices 212 such as a keyboard, mouse, pen, voice-input device, tablet, touch-input device, etc. Output devices 214 such as a display (which may be integrated with a touch-input device), speakers, and printer may also be included. All these devices are well known in the art and need not be discussed at length here.

Figure 3:
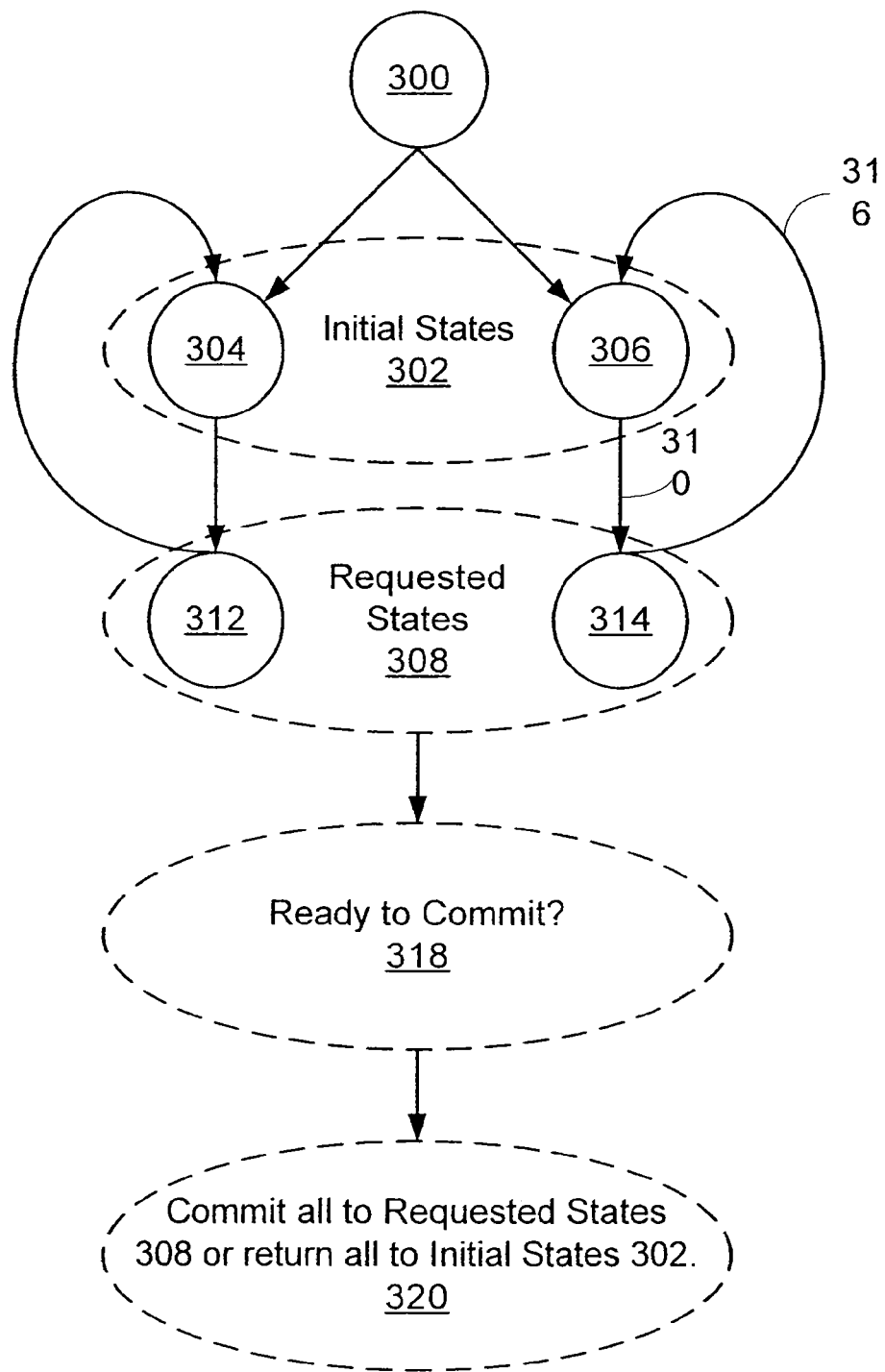
FIG. 3 is a state/transition diagram of a prior art two-phase commit procedure.

To clearly distinguish the present invention from the prior art, FIG. 3 presents the well known, prior art two-phase commit technique for recovering from failures. When a multi-step procedure needs to update more than one database, the two-phase commit technique is often used to ensure that the databases remain synchronized. The procedure begins in state 300. In the example of FIG. 3, two databases are in their initial, pre-procedure, states 302 when they are requested to move to their requested states 308. The request can be, for example, a simple change in the value of a variable that is stored in both databases. It can also be a more complicated move of a resource from one database to the other. In any event, each database attempts to comply with the request. For example, in transition 310 one of the databases attempts to move from its initial state 306 to the requested state 314. If successful, the database, for the moment, marks the change as temporary.

It may happen, on the other hand, that one or both of the databases is unsuccessful in trying to move to its requested state. For example, instead of successfully performing the transition 310, the database may revert in transition 316 to its pre-procedure, initial state 306.

In state 318, a monitoring agent queries all of the databases involved in the procedure to find out whether they have successfully made their transitions. If all of them have, then each database is told to mark its change as permanent in state 320. The update procedure has been successfully performed, and all of the databases are in their requested, post-procedure states 308. If, however, at least one database could not comply with the request, then each database is told to "back out" of the request, that is, to discard the change it marked as temporary. Here, the update procedure has failed, but, because of the back-out enabled by the two-phase commit technique, the databases are still synchronized, albeit in their pre-procedure initial states 302. Because the databases are synchronized, the procedure can be retried or can be abandoned with safety.

This two-phase commit technique is readily applicable to the environment of FIG. 1 only if all of the servers 102, 108, and 110 use the same type of database. (A two-phase commit technique can be developed that will work across different database types, but it would carry a significant cost in development time and in complexity.) As networked devices and as providers of networked devices proliferate, that requirement is daily becoming more difficult to meet. In contrast, the methods of the present invention are applicable across database types and even for devices that do not have a database.

Figure 4:
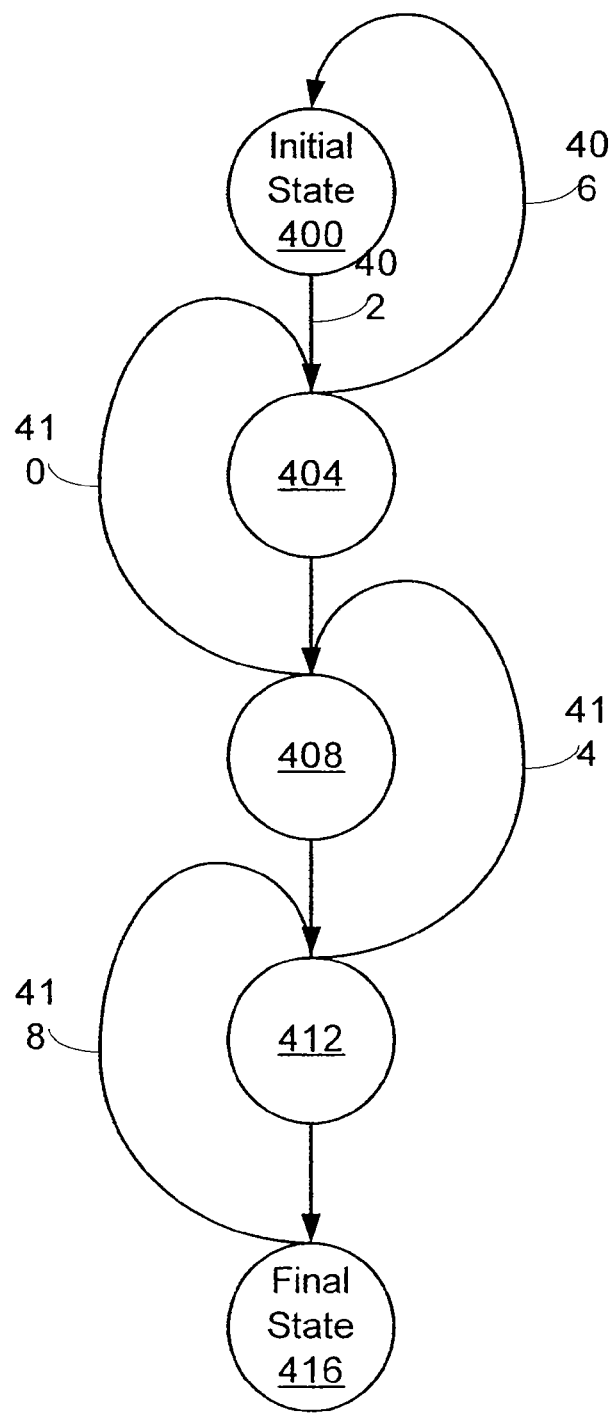
FIG. 4 is a state/transition diagram of a prior art procedure with rollbacks.

FIG. 4 presents a second widely used, prior art technique for failure recovery: rollback upon failure. This technique is often useful in environments that do not share a common database type. The procedure begins at its initial state 400 and attempts to progress through intermediate states 404, 408, and 412 until successfully reaching its final state 416. The vertically downward pointing transitions, such as 402, show the course of the procedure in the absence of failure. If any transition fails, however, the previous results are "rolled back" or undone. For example, if the procedure of FIG. 4 successfully progresses to state 408 but fails to perform the transition to state 412, then the intermediate results (if any) of the attempt to transition to state 412 are undone in the rollback transition 414. The previously performed successful transition from 404 to state 408 is then rolled back in the transition 410. Finally, the rollback transition 406 takes the procedure back to its initial state 400. With all of the intermediate results undone, it is now safe to either retry the procedure or to abandon it, as appropriate.

Unfortunately, the rollback technique of FIG. 4 can be horrendously complex to implement. Each rollback transition, such as 406, can take as much time to develop as the corresponding forward transition, such as 402. Also, if a rollback transition fails, it may in turn need to be rolled back. Thus, the rollback technique compounds the complexity of an already complex multi-step procedure.

Figure 5A:
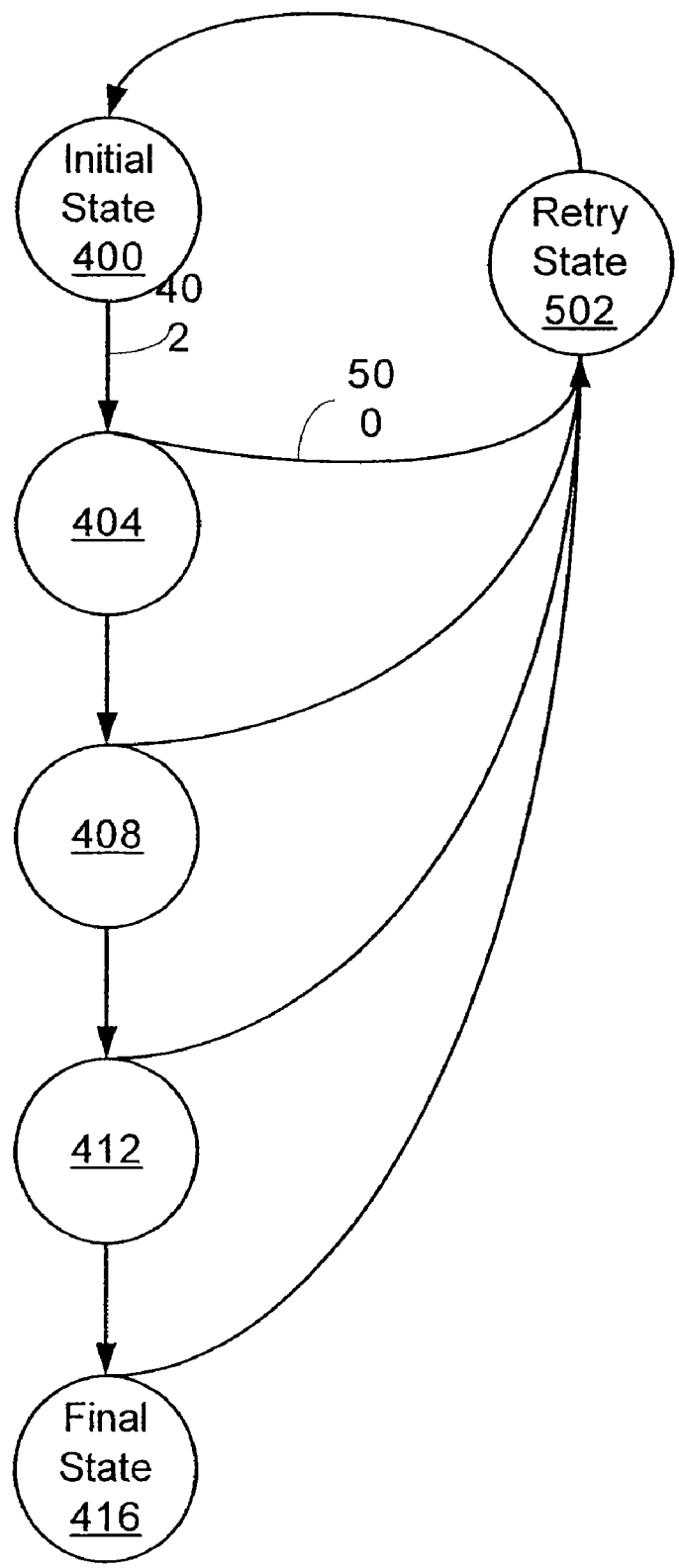
FIGS. 5a and 5b are state/transition diagrams of rollback-free procedures according to embodiments of the present invention.

Contrast the prior art techniques of FIGS. 3 and 4 with the embodiment of the present invention illustrated in FIG. 5a. In the absence of failure, the multi-step procedure of FIG. 5a is identical to that of FIG. 4: Beginning at the initial state 400, the procedure progresses through the intermediate states 404, 408, and 412 until it successfully reaches the final state 416. When a failure is detected, however, the technique illustrated in FIG. 5a does not attempt to rollback the previous results. Instead, regardless of where in the procedure the error occurred, the procedure is redirected, as in the transition 500, to a "retry" or "recovery coordination" state 502. From this state 502, the procedure is sent back directly to its initial state 400 and retried. No rollback transitions need be developed, nor does this technique depend upon common database characteristics.

Figure 5B:
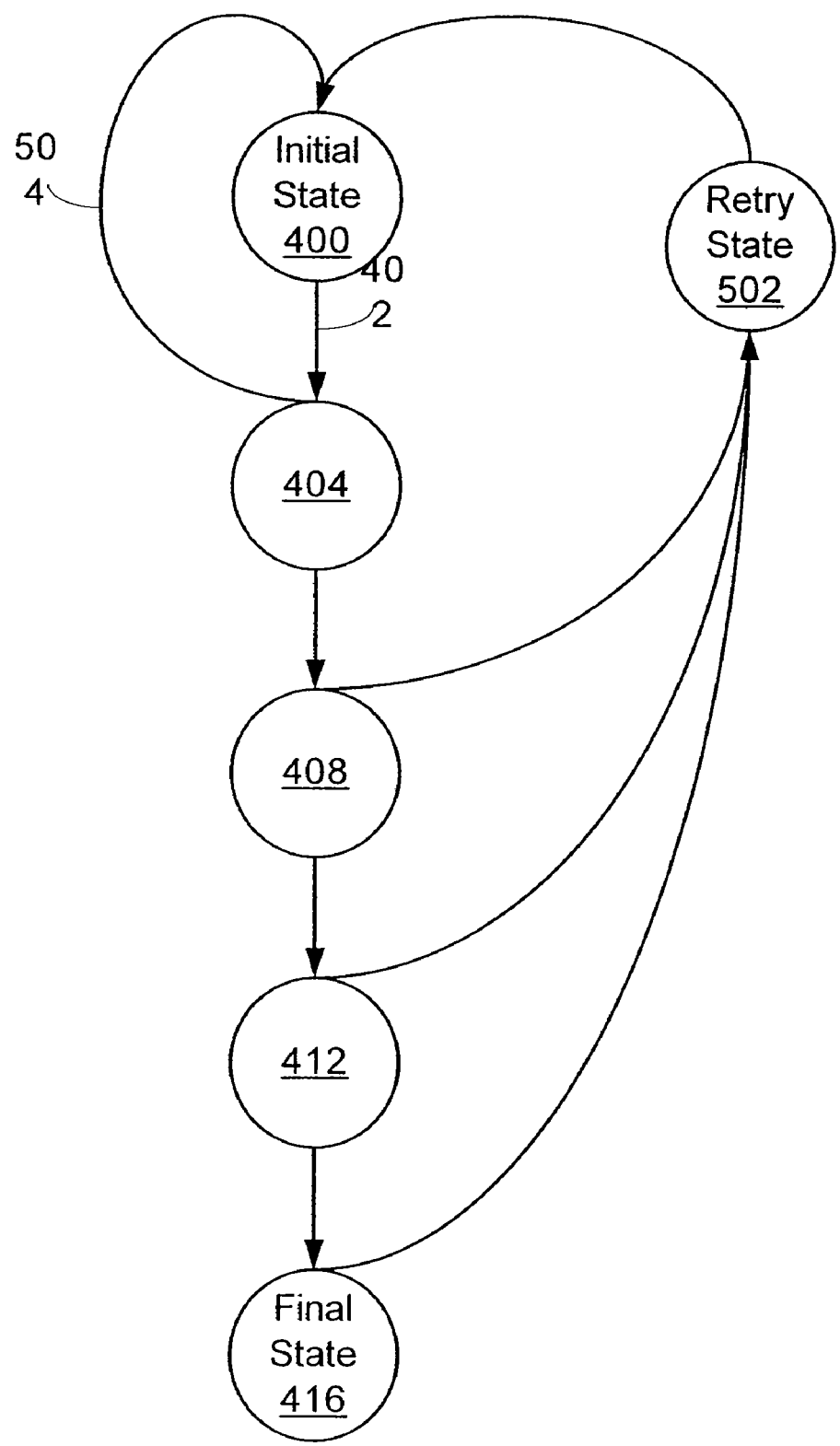

FIG. 5b shows a slight variation on the rollback-free technique of FIG. 5a. In FIG. 5b, if the procedure fails at its very first transition 402, then instead of moving to the recovery coordination state 502, the procedure simply reverts through transition 504 to its initial state 400. This simplification is possible because the failure occurs before any intermediate results are created. Still, it may be preferred to always transition to the recovery coordination state 502 in the event of failure, as in FIG. 5a, in order to generate error messages, track error statistics, and the like.

In order for the rollback-free techniques of the present invention to work properly, the procedure should be tolerant of having its transitions performed multiple times without causing a loss of data integrity. This aspect is discussed below, especially in relation to step 610 of FIG. 6 and in relation to FIGS. 7a and 7b.

An embodiment of the rollback-free technique illustrated in FIGS. 5a and 5b is presented in detail in FIG. 6. The technique begins in step 600 by setting up a failure monitor. In some embodiments, this step is only implied and actually does nothing. In other embodiments, the recovery coordination state 502 of FIG. 5a is initialized here.

Step 602 is included for the sake of completeness. It corresponds to setting the initial state 400 of FIG. 5a. The presence of this step is to show that the procedure begins at its initial state (of course).

The procedure is actually performed in step 604 which corresponds to the states 404, 408, 412, and 416 and their failure-free transitions of FIG. 5a. Step 606 is where failures are detected. Step 606 does not actually follow step 604 but occurs in conjunction with that step. That is simply to say that as the procedure is performed, it is monitored for failures. If no failure is detected, then the procedure terminates successfully in step 612.

If a failure is detected during the performance of the procedure, however, the procedure stops, and control passes to step 608 (which corresponds to the recovery coordination state 502 of FIG. 5a). As appropriate, an error message can be generated in this step. The number of failed attempts can be compared against a pre-determined threshold and the procedure abandoned if the threshold is reached. Error statistics can be gathered which become especially useful when the same failure monitoring is performed on multiple procedures.

Avoiding rollbacks, the rollback-free failure recovery technique begins in step 610 to retry the procedure from the beginning. If some of the transitions specified by the procedure were successfully completed before the failure occurred, then those transitions can be skipped. Alternatively, those successful transitions can be re-executed. This is an important point: The procedure should be designed so that, as much as possible, its transitions can be re-executed without causing a loss of data integrity. In developing a procedure that has this property, it helps to consider the database concept of "idempotence." A database update or a transition in a procedure is said to be idempotent if it can be invoked multiple times and produce the same result every time. For example, consider the case of a variable X with an initial value of 1. Two functions are defined that alter the value of X: INCREMENT(X) gives X a final value 1 more than its previous value, while ASSIGN (2, X) gives X the final value of 2. Clearly, INCREMENT(X) produces a new value for X every time it is run, while ASSIGN(2, X) always leaves X with the final value of 2. ASSIGN(2, X) is idempotent, and INCREMENT(X) is not. Because the techniques of the present invention do not rollback previously created intermediate results, the procedures should be developed with idempotence in mind. Strict idempotence is not always necessary, but the procedure should be able to be performed even in the face of inconsistent data caused by previously created intermediate results. As another simple example, the procedure should be able to intelligently ignore an error message saying that the requested transition has already been performed. An example of such a procedure is discussed below in relation to FIGS. 7a and 7b.

In any case, the procedure begins again at its initial state (400 of FIG. 5a) and progresses through its transitions until it reaches the point of the previous failure. The previously failing transition is retried, possibly with better results. The procedure continues in this fashion until it either successfully reaches its final state 416 or is abandoned.

Figure 7B:
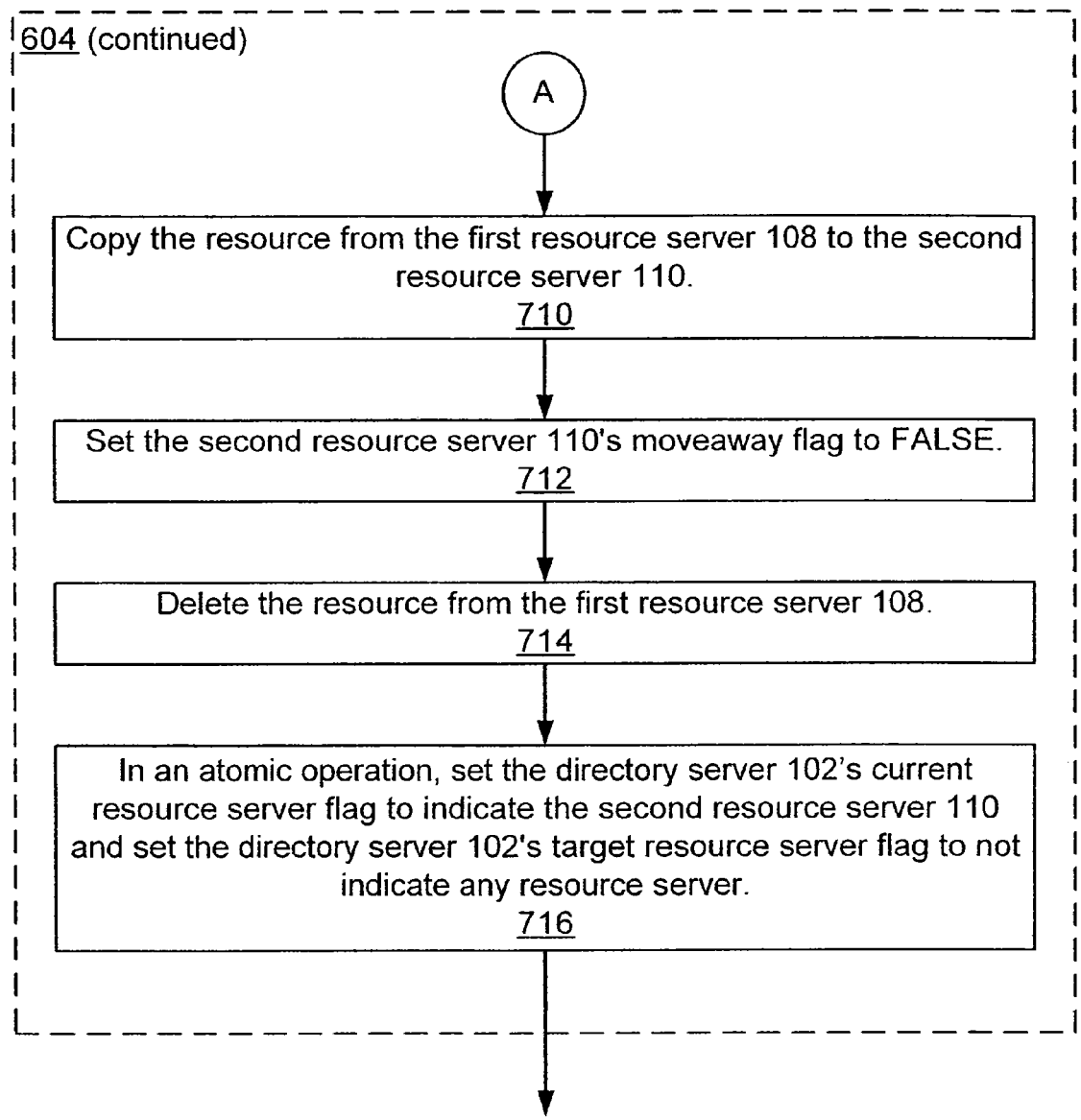
Figure 8A:
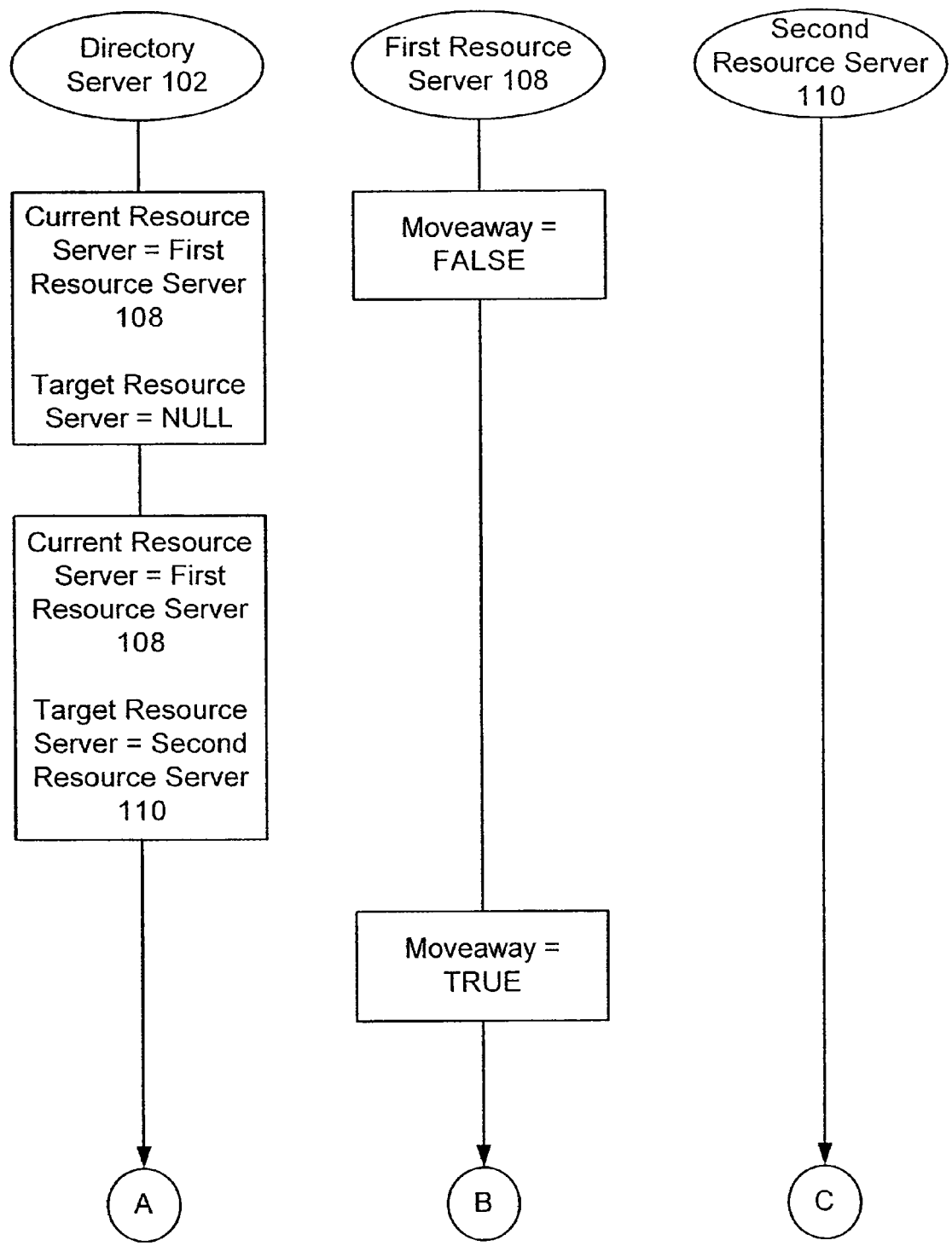
FIGS. 8a and 8b together form a state diagram of the servers in the example of FIGS. 7a and 7b.
Figure 8B:
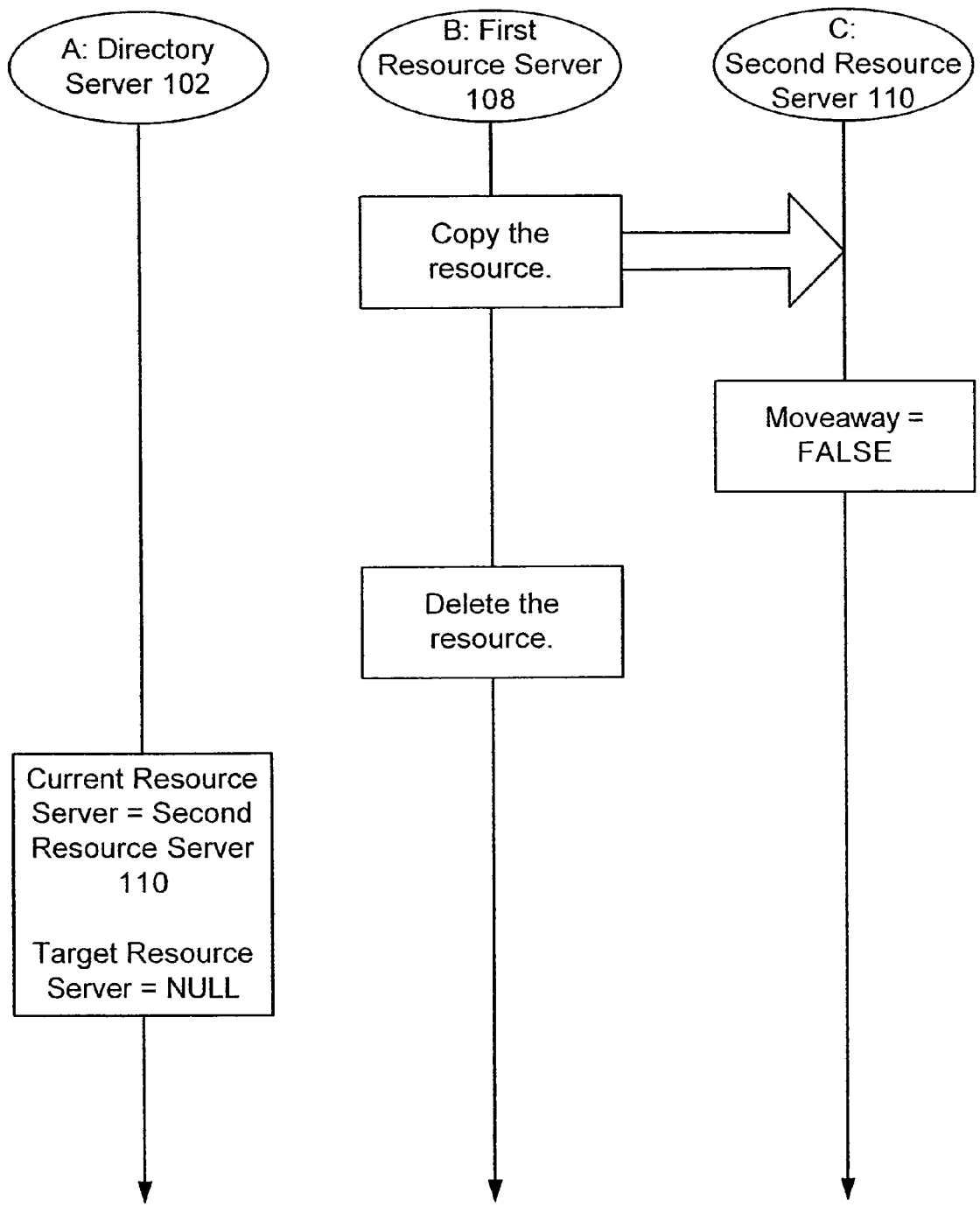

FIGS. 7a, 7b, 8a, and 8b illustrate a procedure developed to work with the rollback-free failure recovery techniques of the present invention. FIGS. 7a and 7b together form a flowchart of the procedure, while FIGS. 8a and 8b show the values of state variables in one embodiment of the same procedure. This procedure moves a resource from the resource server 108 to the other resource server 110. It coordinates these two resources servers along with the directory server 102. Note that this procedure is meant to be illustrative, not limiting: The techniques of the present invention are not restricted to this particular procedure.

Step 602 of FIG. 6 sets a procedure's actors to their initial state. For the particular procedure of FIGS. 7a and 7b, the details of step 602 are given in steps 700, 702, and 704. In this resource-moving procedure, the directory server 102 uses two flags: A current resource server flag indicates where the resource currently resides, and a target resource server flag indicates where the resource is going, if anywhere. In steps 700 and 702, the current resource server flag is set to indicate that the resource resides on the first resource server 108, and the target resource server flag is set to a value that does not indicate any resource server, such as the NULL shown in FIG. 8a.

In this particular embodiment, each of the resource servers 108 and 110 has a Boolean moveaway flag. In step 704, the first resource server 108' moveaway flag is set to FALSE to indicate that the resource-moving procedure has not yet begun. Note that these steps 700, 702, and 704 are not really part of the resource-moving procedure: They are shown to illustrate the state of the actors before the procedure actually begins.

In general, the procedure is actually performed in step 604 of FIG. 6 while being monitored for failures in step 606. In the detailed example of FIGS. 7a and 7b, the resource-moving procedure begins in step 706 when the directory server 102's target resource server flag is set to indicate the second resource server 110. Notice that this step, like most of the steps of this procedure, involves the change of only one variable on only one computing device. This eliminates the possibility of a half-completed step and the attendant loss of data integrity. Then, in step 708, the moveaway flag of the first resource server 108 is set to TRUE to indicate that the resource will soon be leaving.

In step 710 of FIG. 7b, the resource is actually copied to the second resource server 110. While this step can certainly fail part-way through, with only some of the resource copied over, note that no state variables are changed in this step. The state of the resource-moving procedure is always easily recoverable because the state variables are always kept consistent.

In step 712, the moveaway flag of the second resource server 110 is set to FALSE indicating that the just arrived resource is expected to stay a while. In some embodiments, the resource takes up server memory. In these embodiments, the first resource server 108 can delete its copy of the resource in step 714 in order to free up its memory. Once the procedure completes successfully, only the second resource server 110 will ever receive a request for the resource.

Finally, in step 716, the directory server 102 sets its current resource server flag to indicate that the resource is now on the second resource server 110 and sets its target resource server flag so that it does not indicate any resource server. The latter flag is used to indicate that the resource is not currently being moved. In the illustrated embodiment, these two flags are set in one indivisible (or "atomic") operation so that their values remain consistent at all times. Fortunately, some operating systems provide the ability to change exactly two variables in one operation. The atomic operation of step 716 either succeeds with respect to both variables or fails with respect to both so that their values remain consistent. Some operating systems do not provide the ability to change two variables in one atomic operation. If that is the case, then the current resource server flag and the target resource server flag are simply set in consecutive steps.

If a failure is detected at any time during the resource-moving procedure of FIGS. 7a and 7b, the recovery technique of FIG. 6 takes over at step 608. The transitions of the resource-moving procedure are all designed to prevent a loss of data integrity if they are re-executed as part of the recovery technique.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be extended to cover other, non-illustrated multi-step procedures without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

We claim:

1. A method in a computing system for recovering from a failure when transferring a resource from a first server to a second server, the method comprising:
   indicating that the resource is to be transferred from the first server to the second server;
   starting at an initial step execution of a multi-step procedure that effects the transferring of the resource from the first server to the second server as indicated and updating of a directory server that currently references the first server as repository of the resource to reference the second server as repository of the resource, each step of the procedure setting a state and being idempotent such that re-execution of the step with the set state will have the same result as the initial execution of the step, the procedure including copying the resource from the first server to the second server, deleting the resource from the first server, and setting the directory server to reference the second server;
   when an error occurs, restarting at the initial step the execution of the procedure without rolling back state of the previously executed steps so that each step executed after the error occurs will have the same result as when executed before the error occurs; and
   when the execution of the procedure completes, indicating that the resource is not being transferred from the first server.

2. The method of claim 1 wherein whenever it is indicated that the resource is to be transferred from the first server to the second server while the procedure is not executing, restarting execution of the procedure.

3. The method of claim 1 wherein the steps of the procedure do not check for state indicating that an error previously occurred.

4. The method of claim 1 wherein the indicating that the resource is to be transferred from the first server to the second server both identifies the second server and indicates that the transfer to the second server has not yet been completed.

5. The method of claim 1 wherein the procedure performs the same steps during execution regardless of whether an error occurred.

6. A method in a computing system for recovering from a failure when transferring a resource from a first server to a second server, the method comprising:
   indicating that the resource is to be transferred from the first server to the second server;
   starting at an initial step execution of a procedure that effects the transferring of the resource from the first server to the second server as indicated, each step of the procedure setting a state and being idempotent such that re-execution of the step with the set state will have the same effect as the initial execution of the step;
   when an error occurs, restarting at the initial step the execution of the procedure without rolling back state of the previously executed steps so that each step executed after the error occurs will have the same effect as when executed before the error occurs; and
   when the execution of the procedure completes, indicating that the resource is not being transferred from the first server
   wherein a current resource flag indicates the first server and the indicating includes setting a target resource flag to indicate the second server and including:
      setting a moveaway flag of the first server to indicate moveaway;
      copying the resource from the first server to the second server;
      setting a moveaway flag of the second server to indicate not moveaway;
      setting the target resource flag to not indicate the second server; and
      setting the current resource flag to indicate the second server.

7. The method of claim 6 including after setting the moveaway flag of the second server, deleting the resource from the first server.

8. The method of claim 6 wherein the setting of the current resource flag to indicate the second server and the selling of the target resource flag to not indicate the second server are performed as an atomic operation.

9. A computing system for recovering from a failure when transferring a resource from a first device to a second device, comprising:
   a component that sets an indication that the resource is to be transferred from the first device to the second device;
   a component that starts at an initial step execution of a procedure that transfers the resource from the first device to the second device as indicated by indication, each step of the procedure selling a state and being idempotent such that re-execution of the step with the set state will have the same effect as the initial execution of the step;
   a component that detects an error in transferring the resource and restarts execution of the procedure at the initial step without rolling back state of the previously executed steps so that each step previously executed is either re-executed and has the same effect as when executed before the error occurs or skipped relying on the effect of the previous execution of the step; and
   a component that, upon completion of the transfer, sets the indication to indicate that the resource is not being transferred from the first device wherein a current resource flag is set to the first device and the computing system sets a target resource flag to indicate the second device, sets a moveaway flag of the first device to indicate moveaway, copies the resource from the first device to the second device, sets a moveaway flag of the second device to indicate not moveaway, sets the target resource flag to not indicate the second device; and sets the current resource flag to indicate the second device.

10. The computing system of claim 9 wherein the computing system further deletes the resource from the first device after the moveaway flag of the second device is set.

11. The computing system of claim 9 wherein the selling of the current resource flag to indicate the second device and the selling of the target resource flag to not indicate the second device are performed as an atomic operation.

12. A computer-storage medium encoded within computer-executable instructions for controlling computer system to recovering from failure when transferring a resource from a first server to a second server, by a method comprising:
  setting an indication that indicates that the resource is to be transferred from the first server to the second server;
  starting at an initial step execution of a procedure that transfers the resource from the first server to the second server as indicated by the indication, each step of the procedure setting a state and being idempotent such that re-execution of the step with the set state will have the same effect as the initial execution of the step;
  when an error occurs, restarting at the initial step the execution of the procedure without rolling back state of the previously executed steps in such a way that each step is either skipped or re-executed so that after skipping or re-executing a step after the error occurs will result in the same effect as when executed before the error occurs; and
  when the execution of the procedure completes, setting the indication to indicate that the resource is not being transferred further including:
    setting a current resource flag to indicate the first server;
    setting a target resource flag to indicate the second server;
    setting a moveaway flag of the first server to indicate moveaway;
    copying the resource from the first server to the second server;
    setting a moveaway flag of the second server to indicate not moveaway;
    setting the target resource flag to not indicate the second server; and
    setting the current resource flag to indicate the second server.

13. The computer storage medium of claim 12 wherein the setting of the current resource flag to indicate the second server and the setting of the target resource flag to not indicate the second server are performed as an atomic operation.

14. The computer storage medium of claim 12 wherein whenever it is detected that the indication is set to indicate that the resource is to be transferred from the first server to the second server while the procedure is not executing, restarting execution of the procedure.

* * * * *